US012761782B2

(12) United States Patent
Ono et al.

(10) Patent No.: US 12,761,782 B2
(45) Date of Patent: Oct. 13, 2026

(54) INFORMATION PROCESSING DEVICE, INFORMATION PROCESSING METHOD, AND NON-TRANSITORY COMPUTER-READABLE STORAGE MEDIUM

(71) Applicant: ZOZO, Inc., Chiba (JP)

(72) Inventors: Kengo Ono, Chiba (JP); Eri Kojima, Chiba (JP); Fuminori Ando, Chiba (JP); Shunya Yoshioka, Chiba (JP); Miyuki Hori, Chiba (JP)

(73) Assignee: ZOZO, Inc., Chiba (JP)

( * ) Notice: Subject to any disclaimer, the term of this patent is extended or adjusted under 35 U.S.C. 154(b) by 200 days.

(21) Appl. No.: 18/696,648

(22) PCT Filed: Sep. 13, 2022

(86) PCT No.: PCT/JP2022/034183
§ 371 (c)(1),
(2) Date: Mar. 28, 2024

(87) PCT Pub. No.: WO2023/053935
PCT Pub. Date: Apr. 6, 2023

(65) Prior Publication Data

US 2024/0393935 A1 Nov. 28, 2024

(30) Foreign Application Priority Data

Sep. 29, 2021 (JP) ................................ 2021-159093

(51) Int. Cl.
*G06F 3/048* (2013.01)
*G06F 3/04815* (2022.01)
*G06F 3/04847* (2022.01)

(52) U.S. Cl.
CPC ...... *G06F 3/04847* (2013.01); *G06F 3/04815* (2013.01)

(58) Field of Classification Search
None
See application file for complete search history.

(56) References Cited

U.S. PATENT DOCUMENTS 11,721,035 B2 * 8/2023 Do ........................ G06F 1/1626 345/633
2015/0154453 A1 6/2015 Wilf
(Continued)

FOREIGN PATENT DOCUMENTS

CA 3 095 732 * 10/2019
CA 3095732 A1 10/2019
(Continued)

OTHER PUBLICATIONS

Office Action dated Mar. 14, 2025, from corresponding Canadian Patent Application No. 3,232,785, 7 pages.
(Continued)

*Primary Examiner* — Thanh T Vu
(74) *Attorney, Agent, or Firm* — Rimon P.C.

(57) ABSTRACT

An information according to the application concerned includes a receiving unit, a calculating unit, a sending unit, and a learning unit. The receiving unit receives the specification of a measurement position on a body. Based on a body model of the body of a user, the calculating unit calculates, as the calculation result, the size at the measurement position that is received as the specification by the receiving unit. The sending unit sends the measurement result calculated by the calculating unit. Based on the specification of the measurement position, the learning unit learns about the measurement position.

10 Claims, 5 Drawing Sheets

(56) References Cited

U.S. PATENT DOCUMENTS

| | | | | |
|---|---|---|---|---|
| 2019/0051008 | A1* | 2/2019 | Barker | G16H 50/70 |
| 2019/0122424 | A1* | 4/2019 | Moore | G06T 7/62 |
| 2020/0060371 | A1 | 2/2020 | Maezawa | |
| 2020/0126295 | A1* | 4/2020 | Mok | G06V 20/64 |
| 2021/0345733 | A1 | 11/2021 | Maezawa | |
| 2021/0375060 | A1* | 12/2021 | Maezawa | A41H 1/02 |
| 2022/0270387 | A1* | 8/2022 | Bai | G06T 17/00 |
| 2022/0330641 | A1 | 10/2022 | Yeom | |

FOREIGN PATENT DOCUMENTS

| | | | |
|---|---|---|---|
| JP | 2002-279302 | A | 9/2002 |
| JP | 2003-99510 | A | 4/2003 |
| JP | 2018-018381 | * | 2/2018 |
| JP | 2018-18381 | A | 2/2018 |
| JP | 2018-124946 | A | 8/2018 |
| JP | 2018-141717 | A | 9/2018 |
| JP | 2020-095633 | A | 6/2020 |
| JP | 2021-022250 | * | 2/2021 |
| JP | 2021-22250 | A | 2/2021 |
| JP | 2021-056838 | A | 4/2021 |
| KR | 10-2121447 | B1 | 6/2020 |
| WO | 2014/037939 | A1 | 3/2014 |
| WO | 2019/189846 | A1 | 10/2019 |

OTHER PUBLICATIONS

International Search Report issued in the corresponding International Application No. PCT/JP2022/034183 dated Nov. 22, 2022, w/ English Translation.

Notification of Reasons for Refusal issued in the Japanese Patent Application No. 2021-159093 dated Jan. 11, 2022, w/ English Translation.

Notification of Reasons for Refusal issued in the Japanese Patent Application No. 2021-159093 dated Mar. 14, 2023, w/ English Translation.

Office Action dated Feb. 16, 2026, from corresponding United Kingdom Patent Application No. GB2404304.4, 4 pages.

Office Action dated May 26, 2026, issued in corresponding Canadian Patent Application No. 3,232,785.

* cited by examiner

INFORMATION PROCESSING DEVICE, INFORMATION PROCESSING METHOD, AND NON-TRANSITORY COMPUTER-READABLE STORAGE MEDIUM

CROSS-REFERENCE TO RELATED APPLICATIONS

This application is the U.S. National Phase under 35 U.S.C. § 371 of International Application No. PCT/JP2022/034183, filed on Sep. 13, 2022, which in turn claims the benefit of Japanese Application No. 2021-159093, filed Sep. 29, 2021, and the entire contents of each of which are hereby incorporated by reference.

FIELD

The present invention is related to an information processing device, an information processing method, and a non-transitory computer-readable storage medium.

BACKGROUND

Conventionally, a technology is known that measures the body size of the user. For example, a technology is known in which a three-dimensional model (also referred to as a "3D model") of the user is created using a body size measurement costume, and size information related to the physique of the user is obtained.

CITATION LIST

Patent Literature

Patent Literature 1: International Laid-open Pamphlet No. 2019/189846

Patent Literature 2: Japanese Patent Application Laid-open No. 2020-95633

SUMMARY

Technical Problem

However, in the conventional technology, the position at which the measurement is taken is fixed, thereby making it difficult to use the technology in a variety of services.

The present invention is made in view of the issue mentioned above, and it is an objective of the present invention to enable easy measurement of the body size at an arbitrary position.

Solution to Problem

An information processing device of the present invention includes a receiving unit that receives specification of a measurement position on a body, a calculating unit that, based on a body model of body of a user, calculates size at the measurement position as calculation result, and a sending unit that sends the measurement result.

Advantageous Effects of Invention

According to an aspect of the embodiment, it becomes possible to easily measure the body size at an arbitrary position.

DESCRIPTION OF EMBODIMENTS

Figure 1:
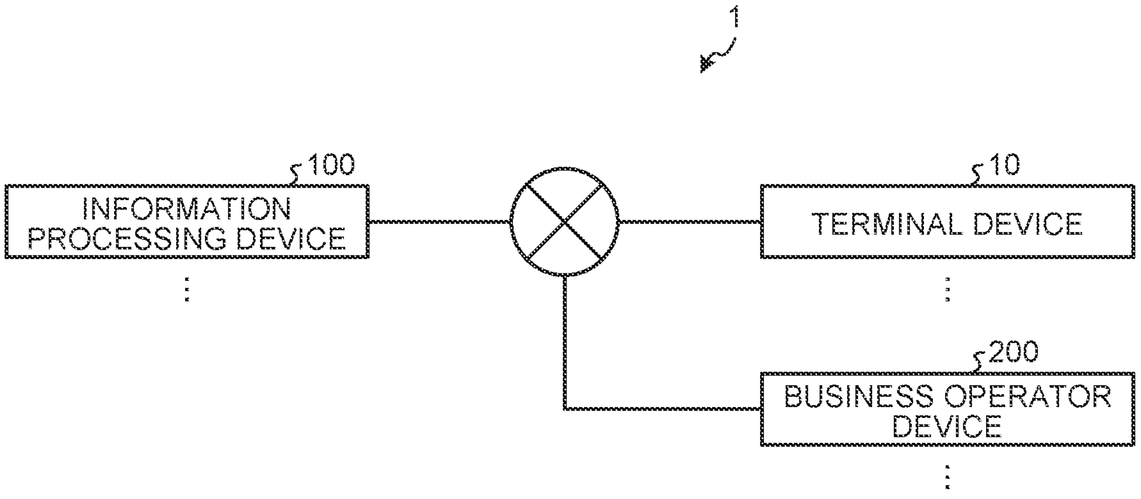
FIG. 1 is a diagram illustrating an exemplary configuration of an information processing system according to an embodiment.

An illustrative embodiment (hereinafter, called an "embodiment") of an information processing device, an information processing method, and an information processing program according to the application concerned is described below in detail with reference to the accompanying drawings. However, the information processing device, the information processing method, and the information processing program are not limited by the embodiment described below. Moreover, in embodiments, identical constituent elements are referred to by the same reference numerals, and the same explanation is not given repeatedly.

Embodiment

[1. Configuration of Information Processing System]

Given below is the explanation about an information processing system 1 illustrated in FIG. 1. As illustrated in FIG. 1, the information processing system 1 includes a terminal device 10, an information processing device 100, and a business operator device 200. The terminal device 10, the information processing device 100, and the business operator device 200 are connected to each other via a predetermined communication network (a network N) in a communicable manner using wired communication or wireless communication. FIG. 1 is a diagram illustrating an exemplary configuration of the information processing system 1 according to the embodiment. Meanwhile, the information processing system 1 illustrated in FIG. 1 can include a plurality of terminal devices 10, a plurality of information processing devices 100, and a plurality of business operator devices 200.

The terminal device 10 is an information processing device used by the user. As long the operations according to the embodiment can be implemented, the terminal device 10 can be any type of device. Thus, the terminal device 10 can be a smartphone, a tablet terminal, a notebook PC (Personal Computer), a desktop PC, a cellular phone handset, or a PDA (Personal Digital Assistant). In the example illustrated in FIG. 2, the terminal device 10 is assumed to be a smartphone.

The terminal device 10 is, for example, a smart device such as a smartphone or a tablet, and represents a handheld terminal device capable of performing communication with arbitrary server devices via a wireless communication network such as LTE (Long Term Evolution) or 4G (Generation). Moreover, the terminal device 10 has a screen made of a liquid crystal display equipped with the touch-sensitive panel functions. Thus, the terminal device 10 can receive various operations such as tap operations, slide operations, and scroll operations performed by the user using a finger or a stylus with respect to the display data such as contents.

Figure 2:
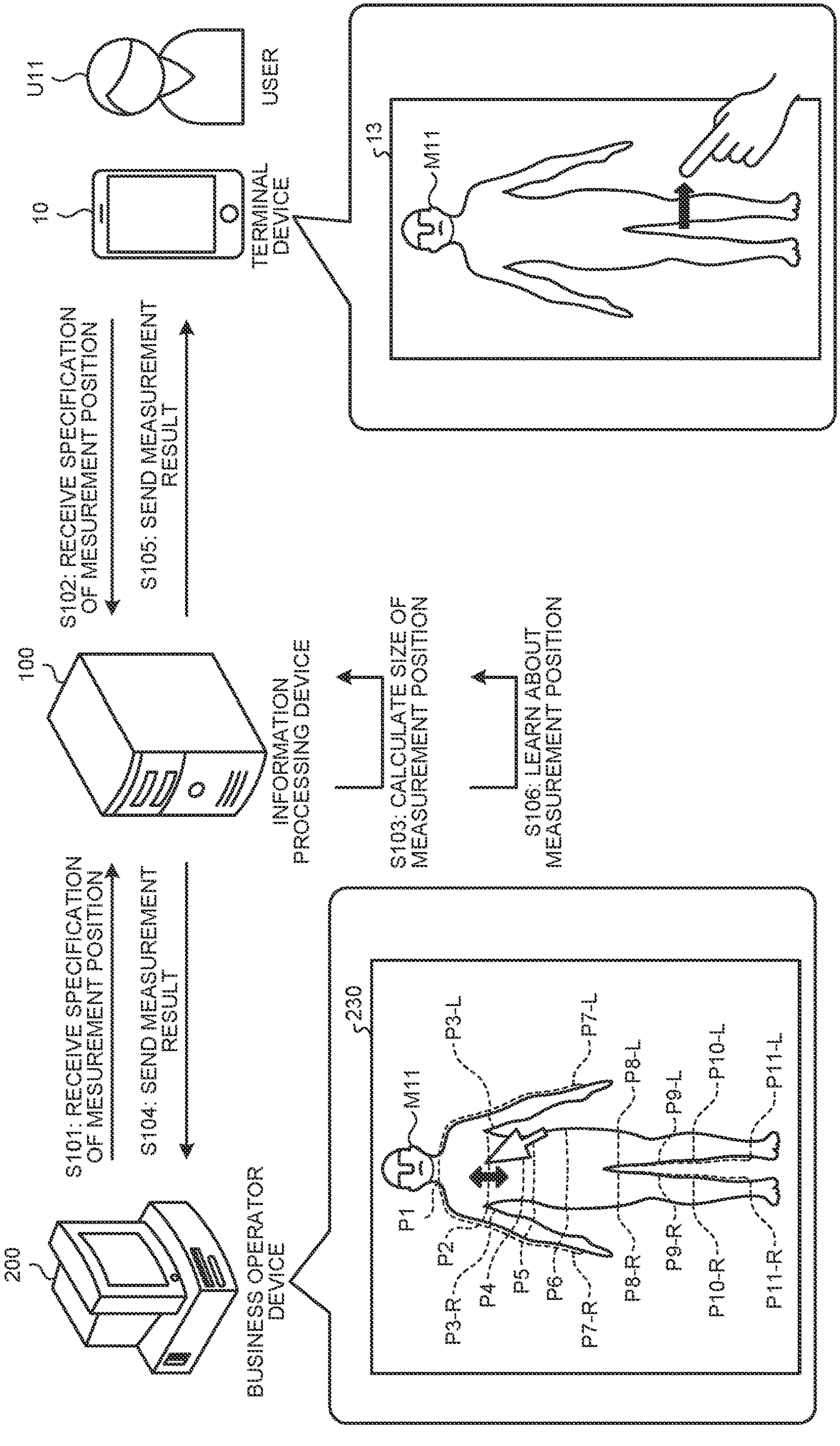
FIG. 2 is a diagram illustrating an example of the information processing performed according to the embodiment.

With reference to FIG. 2, the terminal device 10 is used by the user U11. Thus, in the following explanation, the terminal device 10 is sometimes referred to as the user U11. That is, in the following explanation, the user U11 can also be termed as the terminal device 10.

The information processing device 100 is an information processing device meant for easy measurement of the body size at an arbitrary position. For example, the information processing device 100 is implemented using a server device or a cloud system. The information processing device 100 has, for example, the following functions: receiving the specification of a measurement position on a body; calculating, as the measurement result, the size of the specified measurement position based on a 3D model of the body of the user; sending the calculated measurement result; and learning the measurement position based on the specified measurement position.

The business operator device 200 is an information processing device used by a business operator who makes use of the body size of the user. As long as the operations according to the embodiment can be implemented, the business operator device 200 can be any type of device. Thus, the business operator device 200 can be a smartphone, a tablet terminal, a notebook PC, a desktop PC, a cellular phone handset, or a PDA (Personal Digital Assistant). In the example illustrated in FIG. 2, the business operator device 200 is assumed to be a desktop PC.

In an identical manner to the terminal device 10, the business operator device 200 is a device capable of performing communication with arbitrary server devices via a wireless communication network such as LTE or 4G. Moreover, the business operator device 200 has a screen made of a liquid crystal display equipped with the touch-sensitive panel functions. Thus, the business operator device 200 can receive various operations such as tap operations, slide operations, and scroll operations performed by the user using a finger or a stylus with respect to the display data such as contents.

Meanwhile, with reference to FIG. 1, the terminal device 10 and the information processing device 100 are illustrated to be different devices. Alternatively, the terminal device 10 and the information processing device 100 can be integrated into a single device. In an identical manner, the information processing device 100 and the business operator device 200 can be integrated together.

[2. Example of Information Processing]

Given below is the explanation about the information processing system 1 illustrated in FIG. 2. FIG. 2 is a diagram illustrating an example of the information processing performed in the information processing system 1 according to the embodiment.

The information processing device 100 receives the specification about a measurement position from the business operator device 200 (Step S101). For example, the information processing device 100 receives the specification about a measurement position based on the 3D model of the user as displayed in an output unit 230, such as a monitor, of the business operator device 200. With reference to FIG. 2, the information processing device 100 receives the specification of a measurement position based on a 3D model M11 of the user U11. Alternatively, the specification of a measurement position can be received either based on the 3D model of some other user other than the user U11 or based on a general-purpose 3D model created for the purpose of specifying a measurement position. Moreover, with reference to FIG. 2, the information processing device 100 receives the specification of a measurement position based on a 3D model that represents a body model indicating the size of the body of the user U11. However, alternatively, as long as the size of the body of the user U11 can be indicated, a two-dimensional model (2D model) can also be used. Thus, there is no particular restriction.

In the example illustrated in FIG. 2, in the output unit 230 of the business operator device 200, the 3D model M11 of the user U11 gets displayed. Herein, in the 3D model M11, according to the rules defined in advance at the time of 3D model creation, reference positions serving as the reference for the measurement positions on the outside of the body (hereinafter, called "external reference positions") are displayed. That is, in the 3D model M11, as the lines indicating the reference positions (hereinafter, called "reference lines"), following lines are superimposed using a fluorescence color: neck size P1, chest circumference P2, arm circumference (right) P3-R, arm circumference (left) P3-L, waist P4, waist (above hipbones) P5, hip P6, arm length (right) P7-R, arm length (left) P7-L, thigh circumference (right) P8-R, thigh circumference (left) P8-L, leg length (right) P9-R, leg length (left) P9-L, calf circumference (right) P10-R, calf circumference (left) P10-L, ankle circumference (right) P11-R, and ankle circumference (left) P11-L.

Based on the reference positions mentioned above, the operator of the business operator device 200 specifies a measurement position, at which the body size is to be collected, by performing a mouse operation. At that time, the operator of the business operator device 200 either can directly specify an external reference position mentioned above, or can specify an arbitrary measurement position by adjusting a displayed reference line using a mouse operation. In the example illustrated in FIG. 2, the operator of the business operator device 200 vertically drags the reference line of the chest circumference P2 using the mouse pointer, and makes fine adjustment of the measurement position in the vicinity of the specified chest circumference P2. At that time, for example, using the mouse pointer, the operator of the business operator device 200 can change the length of the arms or change the start point and the end point of the legs, or can specify the measurement of the area or the volume enclosed between the reference line of the waist P4 and the reference line of the waist (above hipbones) P5.

Moreover, based on reference positions serving as the reference for the measurement positions on the inside of the body (hereinafter, called "internal reference positions") as estimated from the 3D model, the operator of the business operator device 200 can specify a measurement positions, at which the body size is to be collected, by performing a mouse operation. The internal reference positions represent the positions of the skeletal frame and the internal organs as estimated from a model (kinetic model) that is related to the movements of the user U11 and that is created from the 3D model M11. For example, the internal reference positions are superimposed using a fluorescence color as points indicating the reference positions on the 3D model M11 (hereinafter, called "reference points"). For example, the operator of the business operator device 200 can click on the reference points of a plurality of joints using the mouse pointer on the 3D model M11, and can specify to measure the length between arbitrary joints.

Moreover, the operator of the business operator device 200 can specify a measurement position, at which the body size is to be collected, based on an operation with respect to the body size measurement costume that is used in creating 3D models. Herein, for example, the body size measurement costume disclosed in Patent Literature 1 is used as the body size measurement costume for creating 3D models. However, as long as it becomes possible to obtain the information for specifying a measurement position on a 3D model, any type of costume can be used. Moreover, the body size measurement costume mentioned above can be meant for measuring the size of the hands, the legs, or the face. Thus, there is no particular restriction. For example, the operator of the business operator device 200 can illuminated the body size measurement costume, which is worn by the user U11, using a laser pointer, and can accordingly specify to measure the length of an arbitrary measurement position.

Furthermore, based on the drawing provided on the 3D model, the operator of the business operator device 200 can specify a measurement position, at which the body size is to be collected, using a mouse operation. For example, the operator of the business operator device 200 can draw a straight line or a circle on the 3D model M11 using the mouse pointer, and can specify to measure the size such as the length, the area, or the volume of an arbitrary measurement position.

The information processing device 100 receives the specification of a measurement position from the terminal device 10 (Step S102). For example, the information processing device 100 receives the specification of a measurement position based on the 3D model of the user as displayed in an output unit 13, such as a monitor, of the terminal device 10. Meanwhile, with reference to FIG. 2, the information processing device 100 receives the specification of a measurement positions from the terminal device 10 based on the 3D model M11 of the user U11. Alternatively, the specification of a measurement position can be received either based on the 3D model of some other user other than the user U11 or based on a general-purpose 3D model created for the purpose of specifying a measurement position.

In the example illustrated in FIG. 2, the 3D model M11 of the user U11 is displayed in the output unit 13 of the terminal device 10; and the user U11 slides a finger over the 3D model M11 and specifies a measurement position in the knee region (left). Moreover, the user U11 can also specify a measurement positions, at which the body size is to be collected, based on the reference lines of an external reference position or the reference line of an internal reference position as displayed on the 3D model M11. Furthermore, the user U11 can specify a measurement position based on an operation performed with respect to the body size measurement costume worn by the user U11. Moreover, the user U11 can specify a measurement position based on the drawing provided on the 3D model M11.

Given below is the explanation about the relationship between the specification of a measurement position by the business operator device 200 (Step S101) and the specification of a measurement position by the terminal device 10 (Step S102). The operations performed at Steps S101 and S102 are only exemplary, and can be performed according to a different sequence than the sequence illustrated in FIG. 2 or can be omitted altogether. That is, the specification of a measurement position can be made only by the business operator device 200 or only by the terminal device 10. Moreover, alternatively, the measurement position specified at an earlier timing can be given priority, or the measurement position specified at a latter timing can be given priority.

Meanwhile, a measurement position specified in advance in the business operator device 200 can be specified to be corrected by the user U11. For example, if the operator of the business operator device 200 specifies the measurement positions for the full-bust measurement and the under bust measurement with the aim of utilizing the measurements in the manufacturing of brassieres, the user U11 can correct the specification of the measurement positions by indicating accurate positions for the full-bust measurement and the under bust measurement on the body size measurement costume worn by the user U11. At that time, either a laser can be bombarded from the terminal device 10 of the user U11 and the measurement positions can be indicated on the body size measurement costume, or the body size measurement costume itself can be made to radiate light to indicate the measurement positions, or the measurement positions can be indicated on the 3D model displayed on the output unit 13 of the terminal device 10.

As explained in regard to the operations performed at Steps S101 and S102, the information processing device 100 receives the specification of a measurement position on the body. Moreover, the information processing device 100 receives the specification of the measurement position that is identified based on a reference position on the outside of the body as defined based on a body model. Furthermore, the information processing device 100 receives the specification of a measurement position that is identified based on an operation performed with respect to the body size measurement costume used in creating a body model. Moreover, the information processing device 100 receives correction from the user about the specification of the measurement position.

The information processing device 100 calculates the size at the measurement position based on the 3D model of the user (Step S103). For example, when the circumference of a position other than the reference lines illustrated in FIG. 2 is specified as the measurement position, the information processing device 100 calculates that circumference based on the information obtained at the time of creation of the 3D model M11 of the user U11. At that time, if no information is available corresponding to the specified measurement position, then the information processing device 100 can calculate the body size based on the information estimated from the 3D model M11 or can send a remeasurement instruction to the terminal device 10.

At the time of calculating the size at the measurement position, the information processing device 100 can also correct the specified measurement position. For example, when the user U11 specifies a measurement position on the 3D model M11 using a finger, the information processing device 100 corrects the start point and the end point in such a way that the specified straight line or the specified surface becomes parallel to the floor, and calculates the body size while treating the post-correction straight line or the post-correction surface as the specified measurement position. At that time, on the output unit 13 of the terminal device 10, the information processing device 100 can display a confirmation message about whether or not the correction is required or can display a screen for enabling selection of the correction method.

As explained in regard to the operation performed at Step S103, the information processing device 100 is a device that calculates, as the measurement result, the size at the measurement position based on the 3D model of the body of the user. Moreover, the information processing device 100 is a device that corrects the measurement position and then calculates the measurement result. The information processing device 100 sends the calculated measurement result to the business operator device 200 (Step S104). For example, the information processing device 100 sends the size information regarding the measurement position that was specified by the business operator device 200. At that time, the information processing device 100 can send the size information regarding the measurement position specified by the terminal device 10, or can send the size information regarding the measurement position corrected by the user U11, or can send the size information regarding the post-correction measurement position. Alternatively, the information processing device 100 can send the size information regarding only such measurement positions which are allowed by the user U11. Meanwhile, the information processing device 100 can send the measurement result also to other terminals (not illustrated).

The information processing device 100 sends the calculated measurement result to the terminal device 10 (Step S105). For example, the information processing device 100 sends the size information regarding the measurement position specified by the terminal device 10. At that time, the information processing device 100 either can send the size information regarding the measurement position specified by the business operator device 200 or can send the size information regarding the post-correction measurement position. Moreover, the information processing device 100 can send the measurement result to other terminals (not illustrated).

As explained in regard to the operations performed at Steps S104 and S105, the information processing device 100 sends the calculated measurement result. Meanwhile, the operations performed at Steps S104 and S105 illustrated in FIG. 2 are only exemplary, and can be performed according to a different sequence than the sequence illustrated in FIG. 2 or can be omitted altogether.

The information processing device 100 learns about the received specification of the measurement position (Step S106). For example, the information processing device 100 uses a learning model and, as the measurement position specified by the business operator device 200, learns about the measurement position specified by each business operator. That is, the information processing device 100 learns about the body part corresponding to the measurement position at which the body size is to be collected for each business operator, and learns about the trend of adjustment with reference to the external reference position. Moreover, using a learning model, the information processing device 100 learns about the measurement position corrected by the user U11 and learns about the corrected measurement position. For example, the information processing device 100 learns about the position of the under bust as corrected by the user U11 and, at the time of calculating the measurement result of the position of the under bust of some other user, can calculate the size of the under bust based on the post-learning measurement position.

As explained in regard to the operation performed at Step S106, the information processing device 100 is a device that, based on the specification of a measurement position, learns about that measurement position. Moreover, the information processing device 100 is a device that learns about the corrected measurement position.

As explained in regard to the operations performed at Steps S101 to S106, the information processing device 100 receives the specification of a measurement position from the business operator device 200 or from the terminal device 10 of the user U11; calculates the size at the measurement position based on the 3D model M11 of the user U11; and sends the calculated measurement result to the business operator device 200 or to the terminal device 10 of the user U11. In the past, the measurement positions such as the waist P4 and the hip P6 were kept defined, and it was difficult to use the measurement positions in a variety of services. However, as a result of becoming able to measure the size at any arbitrary position, it is possible to collect the body size that is easier to put to use. That is, it can be expected that the operator who is seeking the physique data for use in a variety of services such as undergarments, diet, healthcare, sports, gaming, and fashion is provided with minute data.

Meanwhile, the information processing device 100 can receive correction made by the user U11 in the specification of a measurement position, and can accordingly correct the measurement position and learn about the received specification of the measurement position. In the past, it used to take time and efforts to specify or correct a measurement position. Such time and efforts can now be reduced. Moreover, as compared to the past, more accurate measurement of the size can be expected.

[3. Configuration of Information Processing Device]

Figure 3:
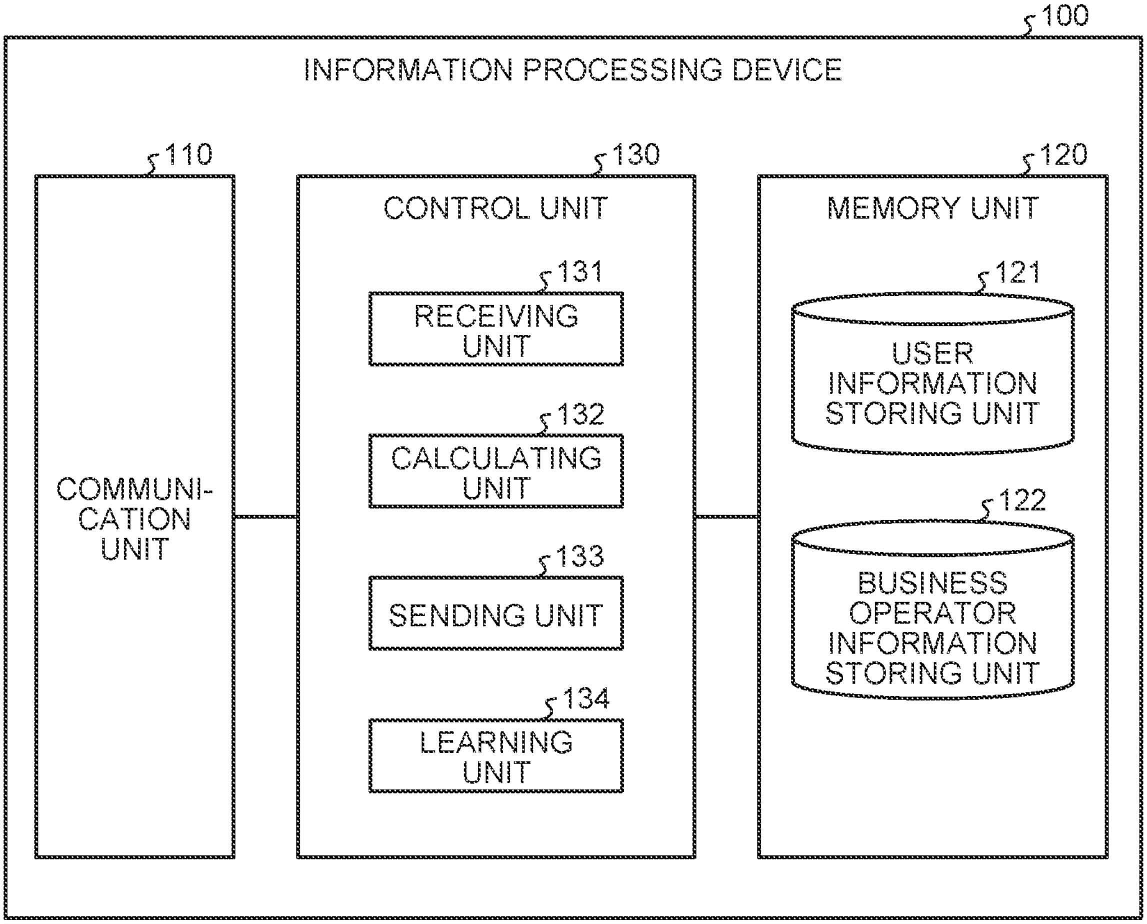
FIG. 3 is a diagram illustrating an exemplary configuration of an information processing device according to the embodiment.

Explained below with reference to FIG. 3 is a configuration of the information processing device 100 according to the embodiment. FIG. 3 is a diagram illustrating an exemplary configuration of the information processing device 100 according to the embodiment. As illustrated in FIG. 3, the information processing device 100 includes a communication unit 110, a memory unit 120, and a control unit 130. Moreover, the information processing device 100 can include an input unit (for example, a keyboard or a mouse) for receiving various operations from the administrator of the information processing device 100, and a display unit (for example, a liquid crystal display) for displaying a variety of information.

(Communication Unit 110)

The communication unit 110 is implemented using, for example, an NIC (Network Interface Card). The communication unit 110 is connected to the network N in a wired manner or a wireless manner, and communicates information with the terminal device 10 and the business operator device 200 via the network N.

(Memory Unit 120)

The memory unit 120 is implemented, for example, using a semiconductor memory device such as a RAM (Random Access Memory) or a flash memory, or using a memory device such as a hard disk or an optical disc. As illustrated in FIG. 3, the memory unit 120 includes a user information storing unit 121 and a business operator information storing unit 122.

The user information storing unit 121 is used to store the information related to each user. For example, the user information storing unit 121 is used to store the following items: “user ID” representing the identification information of each user; “3D model information” representing the information of the 3D model of each user; “size information” representing the body size of each user; “period information” representing the measurement period of the size information; and “user position information” indicating the specification or the correction of measurement positions as made by each user.

The business operator information storing unit 122 is used to store the information related to each business operator. For example, the business operator information storing unit 122 is used to store the following items: “business operator ID” representing the identification information of each business operator; and "business operator position information" representing the correction or the specification of measurement positions as made by each business operator.

(Control Unit 130)

The control unit 130 is a controller implemented when, for example, a CPU (Central Processing Unit) or an MPU (Micro Processing Unit) executes various programs, which are stored in an internal memory device of the information processing device 100, while using the RAM as the work area. Alternatively, the control unit 130 is a controller implemented using, for example, an integrated circuit such as an ASIC (Application Specific Integrated Circuit) or an FPGA (Field Programmable Gate Array).

As illustrated in FIG. 3, the control unit 130 includes a receiving unit 131, a calculating unit 132, a sending unit 133, and a learning unit 134. The control unit 130 implements or executes the functions of information processing as explained below. Meanwhile, the internal configuration of the control unit 130 is not limited to the configuration illustrated in FIG. 3. That is, as long as the information processing explained below can be performed, any other configuration can also be adapted.

(Receiving Unit 131)

The receiving unit 131 receives the specification of a measurement position on the body. For example, the receiving unit 131 receives the specification of a measurement position identified based on the external reference positions on the body as defined according to a body model. That is, the receiving unit 131 receives the specification of an arbitrary measurement position that is defined at the time of creating a 3D model and that is identified based on the external reference positions on the body, such as the neck size, the chest circumference, the arm circumference, the waist, the waist (above hipbones), the hip, the arm length, the thigh circumference, the leg length, the calf circumference, and the ankle circumference. Moreover, the receiving unit 131 receives the specification of an arbitrary measurement position identified as a result of a device operation performed by the operator of the business operator device 200 or by the user U11.

Furthermore, the receiving unit 131 receives the specification of a measurement position identified based on the internal reference positions of the body as estimated based on the body model. That is, the receiving unit 131 receives the specification of an arbitrary measurement position that is estimated according to a kinetic model created from the information related to the 3D model and the actions of the user and that is identified based on the internal reference positions of the body, such as the skeletal frame including a plurality of bones and joints, the muscles, the internal organs, and the blood vessels. Moreover, the receiving unit 131 receives the specification of an arbitrary measurement position identified as a result of a device operation performed by the operator of the business operator device 200 or by the user U11.

Moreover, the receiving unit 131 receives the specification of a measurement position identified based on an operation performed with respect to the body size measurement costume used in creating a body model. That is, the receiving unit 131 receives the specification for measuring the body size at an arbitrary position according to an operation performed by the operator of the business operator device 200, such as either illuminating the body size measurement costume, which is worn by the user U11, with a laser point, or causing the body size measurement costume to radiate light, or indicating the measurement position on the displayed 3D model M11. Moreover, according to an operation performed by the user U11, the position of contact on the body size measurement costume worn by the user U11 can be detected, and the receiving unit 131 can receive the specification about measuring the length of an arbitrary measurement position.

Furthermore, based on the drawing provided on the body model, the receiving unit 131 can receive the specification about a measurement position, at which the body size is to be collected, according to a mouse operation. For example, based on a straight line or a circle drawn on the 3D model M11 using a mouse pointer, the receiving unit 131 can receive the specification about measuring the length, the area, and the volume at an arbitrary measurement position.

Moreover, the receiving unit 131 receives correction made by the user in the specification of a measurement position. That is, the measurement position specified in advance by the business operator device 200 can be specified to be corrected by the user U11.

Moreover, the receiving unit 131 receives the specification of a measurement position using a learning model. That is, based on the specification, the adjustment, and the correction of a measurement position as learnt by the learning unit 134, the receiving unit 131 receives the specification of the measurement position corresponding to each user.

The receiving unit 131 obtains a variety of information from the user information storing unit 121 or the business operator information storing unit 122. Moreover, the receiving unit 131 stores a variety of information in the user information storing unit 121 or the business operator information storing unit 122.

(Calculating Unit 132)

The calculating unit 132 calculates the size at a measurement position as the measurement result based on the body model of the body of a user. For example, when the circumference at a position other than the reference lines defined on the outside of the body is specified as the measurement position, the calculating unit 132 calculates that circumference based on the information obtained based on the body size measurement costume at the time of creating the 3D model M11 of the user U11.

Moreover, the calculating unit 132 corrects the measurement position and then calculates the measurement result. For example, when the user U11 specifies the measurement position on the 3D model Ml using a finger, the calculating unit 132 corrects the start point and the end point in such a way that the specified straight line or the specified surface becomes parallel to the floor, and calculates the body size while treating the post-correction straight line as the specified measurement position.

Moreover, the calculating unit 132 corrects the measurement position using a learning model. That is, based on the correction of the measurement position as learnt by the learning unit 134, the calculating unit 132 corrects the measurement position for each user.

(Sending Unit 133)

The sending unit 133 sends the measurement result. For example, the sending unit 133 sends, to the business operator device 200 or the terminal device 10, the size information regarding the measurement position specified by the operator of the business operator device 200. Moreover, the sending unit 133 sends, to the business operator device 200 or the terminal device 10, the size information regarding the measurement position specified by the user U11. Alternatively, the sending unit 133 can send, to the business operator device 200, the size information of only such measurement positions which are allowed by the user U11.

Meanwhile, the sending unit 133 can send the measurement result also to other terminals (not illustrated).

(Learning Unit 134)

The learning unit 134 learns about a measurement position based on the specification of that measurement position. For example, based on the specification, the adjustment, and the correction of the measurement position as implemented on the 3D model M11 of the user U11, the learning unit 134 learns about the learning model in such a way that the corresponding measurement position on the 3D model of another user is identified. Moreover, the learning unit 134 learns about the corrected measurement position. For example, based on the correction of a measurement position as performed on the 3D model M11 of the user U11, the learning unit 134 learns about the learning model to calculate the body size at the corresponding measurement position on the 3D model of another user. At that time, the learning unit 134 can learn about the learning model according to back-propagation.

[4. Configuration of Terminal Device]

Figure 4:
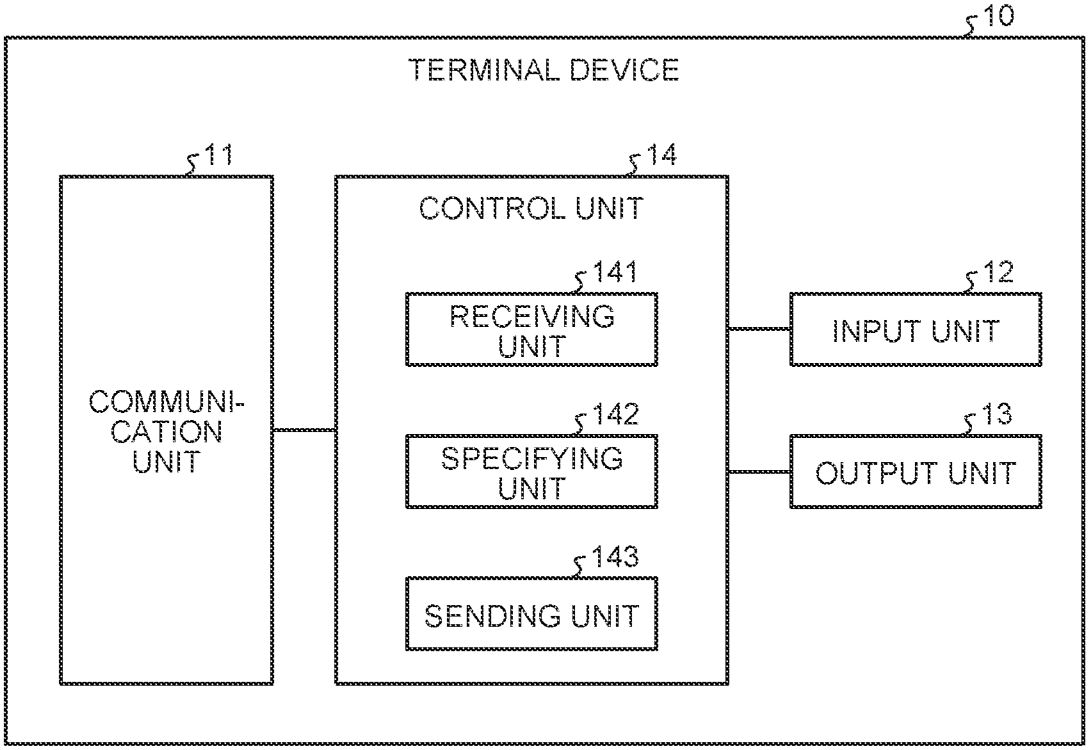
FIG. 4 is a diagram illustrating an exemplary configuration of a terminal device according to the embodiment.

Given below is the explanation about a configuration of the terminal device 10 according to the embodiment. FIG. 4 is a diagram illustrating an exemplary configuration of the terminal device 10 according to the embodiment. As illustrated in FIG. 4, the terminal device 10 includes a communication unit 11, an input unit 12, an output unit 13, and a control unit 14.

(Communication Unit 11)

The communication unit 11 is implemented using, for example, an NIC. The communication unit 11 is connected to the predetermined network N in wired manner or a wireless manner, and communicates information with the information processing device 100 via the predetermined network N.

(Input Unit 12)

The input unit 12 receives various operations from the user U11. For example, the input unit 12 can receive various operations from the user U11 via a display screen and based on the touch-sensitive panel functions. Moreover, the input unit 12 can receive various operations from the buttons disposed in the terminal device 10 or from the keyboard or the mouse connected to the terminal device 10.

(Output Unit 13)

The output unit 13 is the display screen of a tablet terminal and is implemented using, for example, a liquid crystal display or an organic EL (Electro-Luminescence) display. Thus, the output unit 13 represents a display device meant for displaying a variety of information. For example, the output unit 13 displays the information sent from the information processing device 100.

(Control Unit 14)

The control unit 14 is, for example, a controller implemented when, for example, a CPU or an MPU executes various programs, which are stored in an internal memory device of the terminal device 10, while using the RAM as the work area. For example, the various programs include the programs of the applications installed in the terminal device 10. For example, the various programs include the program of the application meant for displaying the information sent from the information processing device 100. Meanwhile, the control unit 14 is alternatively implemented using, for example, an integrated circuit such as an ASIC or an FPGA.

As illustrated in FIG. 4, the control unit 14 includes a receiving unit 141, a specifying unit 142, and a sending unit 143; and implements or executes the functions of information processing as explained below.

(Receiving Unit 141)

The receiving unit 141 receives a variety of information. Herein, the receiving unit 141 receives a variety of information from external information processing devices. Thus, the receiving unit 141 receives a variety of information from other information processing devices such as the information processing device 100. For example, the receiving unit 141 receives, from the information processing device 100, the information to be used in displaying the 3D model M11 of the user U11. Moreover, the receiving unit 141 receives, from the information processing device 100, the size information regarding a measurement position specified by the user U11.

(Specifying Unit 142)

The specifying unit 142 specifies, according to an operation performed by the user U11, a measurement position, at which the body size is to be collected, based on the reference lines of the external reference positions displayed on the 3D model M11 and based on the reference points of the internal reference positions. Moreover, the specifying unit 142 can specify a measurement position also based on an operation performed with respect to the body size measurement costume worn by the user U11. Furthermore, the specifying unit 142 can specify a measurement position also based on the drawing provided on the 3D model.

(Sending Unit 143)

The sending unit 143 sends a variety of information to external information processing devices. Herein, the sending unit 143 sends a variety of information to other information processing devices such as the information processing device 100. For example, the sending unit 143 sends user position information indicating the measurement position specified or corrected by the specifying unit 142 according to an operation performed by the user.

[5. Configuration of Business Operator Device]

Figure 5:
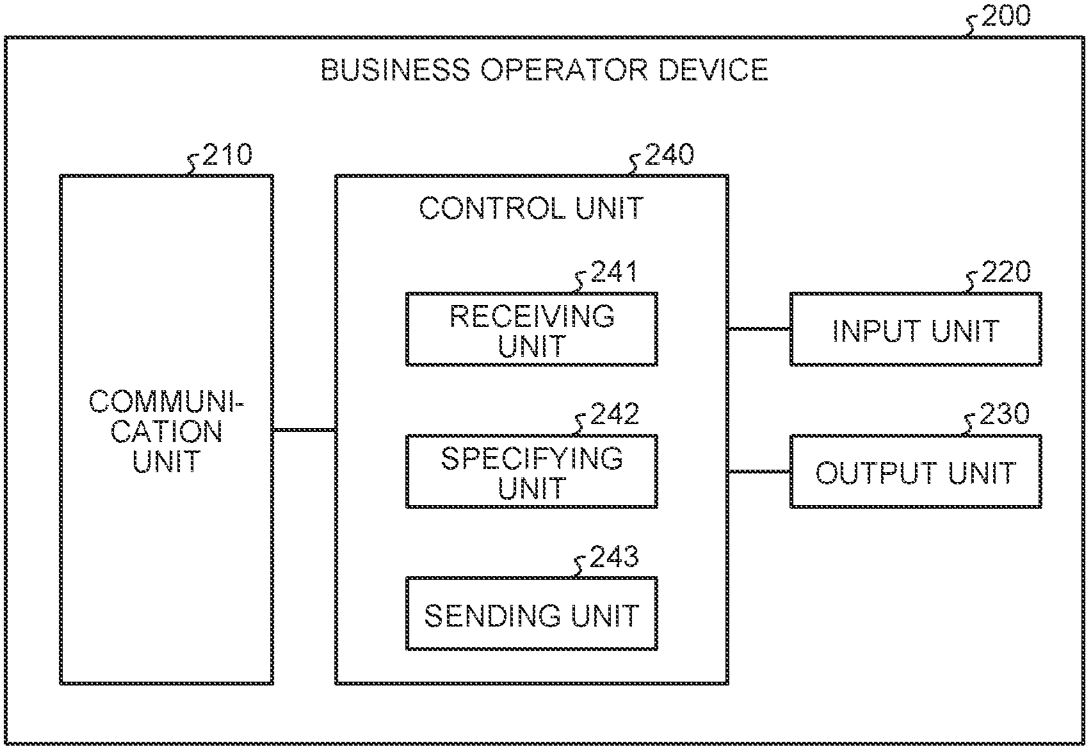
FIG. 5 is a diagram illustrating an exemplary configuration of a business operator device according to the embodiment.

Explained below with reference to FIG. 5 is a configuration of the business operator device 200 according to the embodiment. FIG. 5 is a diagram illustrating an exemplary configuration of the business operator device 200 according to the embodiment. As illustrated in FIG. 5, the business operator device 200 includes a communication unit 210, an input unit 220, an output unit 230, and a control unit 240.

(Communication Unit 210)

The communication unit 210 is implemented using, for example, an NIC. The communication unit 210 is connected to the predetermined network N in wired manner or a wireless manner, and communicates information with the information processing device 100 via the predetermined network N.

(Input Unit 220)

The input unit 220 receives various operations from the operator. For example, the input unit 220 can receive various operations from the operator via a display screen and based on the touch-sensitive panel functions. Moreover, the input unit 220 can receive various operations from the buttons disposed in the business operator device 200 or from the keyboard or the mouse connected to the business operator device 200.

(Output Unit 230)

The output unit 230 is the display screen of a tablet terminal and is implemented using, for example, a liquid crystal display or an organic EL display. Thus, the output unit 230 represents a display device meant for displaying a variety of information. For example, the output unit 230 displays the information sent from the information processing device 100.

(Control Unit 240)

The control unit 240 is, for example, a controller implemented when, for example, a CPU or an MPU executes various programs, which are stored in an internal memory device of the business operator device 200, while using the RAM as the work area. For example, the various programs include the programs of the applications installed in the business operator device 200. For example, the various programs include the program of the application meant for displaying the information sent from the information processing device 100. Meanwhile, the control unit 240 is alternatively implemented using, for example, an integrated circuit such as an ASIC or an FPGA.

As illustrated in FIG. 5, the control unit 240 includes a receiving unit 241, a specifying unit 242, and a sending unit 243; and implements or executes the functions of information processing as explained below.

(Receiving Unit 241)

The receiving unit 241 receives a variety of information. Herein, the receiving unit 241 receives a variety of information from external information processing devices. Thus, the receiving unit 241 receives a variety of information from other information processing devices such as the information processing device 100. For example, the receiving unit 241 receives, from the information processing device 100, information to be used in displaying the 3D model M11 of the user U11. Moreover, the receiving unit 241 receives, from the information processing device 100, the size information regarding the measurement position specified by the operator of the business operator device 200.

(Specifying Unit 242)

The specifying unit 242 specifies, according to an operation performed by the operator of the business operator device 200, a measurement position, at which the body size is to be collected, based on the reference lines of the external reference positions displayed on the 3D model M11 and based on the reference points of the internal reference positions. Moreover, the specifying unit 242 can specify a measurement position also based on an operation performed with respect to the body size measurement costume worn by the user U11. Furthermore, the specifying unit 242 can specify a measurement position also based on the drawing provided on the 3D model.

(Sending Unit 243)

The sending unit 243 sends a variety of information to external information processing devices. Herein, the sending unit 243 sends a variety of information to other information processing devices such as the information processing device 100. For example, the sending unit 243 sends business operator position information indicating the measurement position specified or corrected by the specifying unit 242 according to an operation performed by the operator of the business operator device 200.

[6. Flow of Information Processing]

Figure 6:
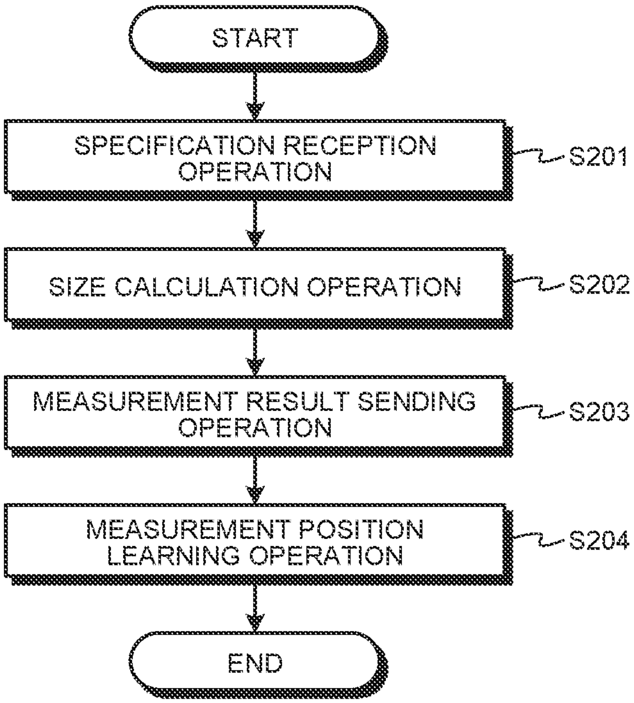
FIG. 6 is a flowchart for explaining the sequence of operations involved in the information processing performed according to the embodiment.

Given below is the explanation of the sequence of operations involved in the information processing performed in the information processing system 1 according to the embodiment. FIG. 6 is a flowchart for explaining the sequence of operations involved in the information processing performed in the information processing system 1 according to the embodiment. The operations performed from Step S201 to Step S204 illustrated in FIG. 6 are only exemplary, and can be performed according to a different sequence than the sequence illustrated in FIG. 6 or can be omitted altogether.

As illustrated in FIG. 6, the information processing device 100 performs a specification reception operation (Step S201). That is, the information processing device 100 receives the specification of a measurement position from the business operator device 200 or the terminal device 10.

The information processing device 100 performs a size calculation operation (Step S202). That is, the information processing device 100 calculates the body size at the specified measurement position.

The information processing device 100 performs a measurement result sending operation (Step S203). That is, the information processing device 100 sends the measurement result including the size information to the business operator device 200 or the terminal device 10.

The information processing device 100 performs a measurement position learning operation (Step S204). That is, the information processing device 100 learns about the specified measurement position.

[7. Effects]

As explained above, the information processing device 100 according to the embodiment includes the receiving unit 131, the calculating unit 132, and the sending unit 133. The receiving unit 131 receives the specification of a measurement position on the body. The calculating unit 132 calculates, based on the three-dimensional model of the body of the user, the size at the measurement position as the measurement result. The sending unit 133 sends the measurement result.

As a result, the information processing device 100 according to the embodiment is able to easily measure the body size at an arbitrary position.

Moreover, the information processing device 100 according to the embodiment further includes the learning unit 134 that learns about a measurement position based on the specification of the measurement position.

As a result, the information processing device 100 according to the embodiment can easily measure the body size at an arbitrary position, while achieving reduction in the time and efforts required for the input as a result of learning the measurement position.

Moreover, the receiving unit 131 receives the specification of a measurement position that is identified based on the external reference positions on the body as defined based on a three-dimensional model.

As a result of receiving the specification based on the defined measurement position on the outside of the body, the information processing device 100 according to the embodiment becomes able to easily measure the body size at an arbitrary position while achieving reduction in the time and efforts required for the input.

Furthermore, the receiving unit 131 receives the specification of a measurement position identified based on the internal reference positions of the body as estimated based on a three-dimensional model.

As a result of receiving the specification based on the estimated measurement position on the inside of the body, the information processing device 100 according to the embodiment becomes able to easily measure the body size at an arbitrary position while achieving reduction in the time and efforts required for the input.

Moreover, the receiving unit 131 receives the specification of a measurement position identified based on an operation performed with respect to the body size measurement costume used in creating a three-dimensional model.

As a result of receiving the specification of the measurement position based on an operation performed with respect to the body size measurement costume, the information processing device 100 according to the embodiment becomes able to easily measure the body size at an arbitrary position while achieving reduction in the time and efforts required for the input.

Furthermore, the receiving unit 131 further receives correction made by the user in the specification of a measurement position.

As a result, the information processing device 100 according to be embodiment becomes able to easily measure more accurate body size at an arbitrary position, with the correction made by the user in the specification of the measurement position reflected therein.

Moreover, the calculating unit 132 corrects the measurement position and measures the measurement result, and then the learning unit 134 learns about the corrected measurement position.

As a result, the information processing device 100 according to the embodiment becomes able to easily measure more accurate body size at an arbitrary position, with the correction in the measurement position reflected therein.

[8. Hardware Configuration]

Figure 7:
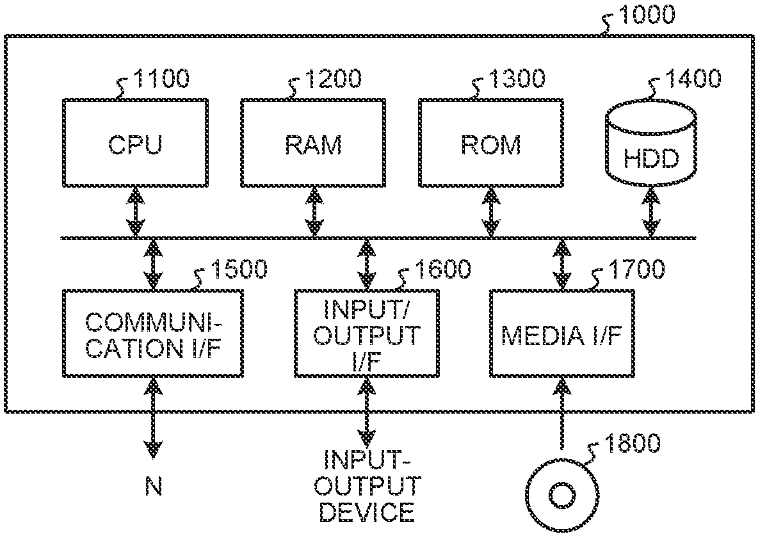
FIG. 7 is a hardware configuration diagram illustrating an example of a computer that implements the functions of the information processing device.

The terminal device 10, the information processing device 100, as well as the business operator device 200 according to the embodiment described above is implemented using, for example, a computer 1000 having the configuration illustrated in FIG. 7. FIG. 7 is a hardware configuration diagram illustrating an example of the computer that implements the functions of the terminal device 10, the information processing device 100, and the business operator device 200. The computer 1000 includes a CPU 1100, a RAM 1200, a ROM 1300, an HDD 1400, a communication interface (I/F) 1500, an input-output interface (I/F) 1600, and a media interface (I/F) 1700.

The CPU 1100 performs operations based on the programs stored in the ROM 1300 or the HDD 1400, and controls the other constituent elements. The ROM 1300 is used to store the boot program that is executed by the CPU 1100 at the time of booting of the computer 1000, and to store the programs that are dependent on the hardware of the computer 1000.

The HDD 1400 is used to store the programs that are to be executed by the CPU 1100, and to store the data that is to be used in those programs. The communication interface 1500 receives data from other devices via a predetermined communication network and sends the data to the CPU 1100, as well as sends the data generated by the CPU 1100 to other devices via the predetermined communication network.

The CPU 1100 controls output devices, such as a display and a printer, and input devices, such as a keyboard and a mouse, via the input-output interface 1600. The CPU 1100 obtains data from the input device via the input-output interface 1600. Moreover, the CPU 1100 outputs the generated data to the output device via the input-output interface 1600.

The media interface 1700 reads the programs or the data stored in a recording medium 1800, and provides them to the CPU 1100 via the RAM 1200. Then, the CPU 1100 loads the programs from the recording medium 1800 in the RAM 1200 via the media interface 1700, and executes the loaded programs. The recording medium 1800 is, for example, an optical recording medium such as a DVD (Digital Versatile Disc) or a PD (Phase change rewritable Disk); or a magnetooptical recording medium such as an MO (Magento-Optical disk); or a tape medium; or a magnetic recording medium; or a semiconductor memory.

For example, when the computer 1000 functions as the terminal device 10, the information processing device 100, and the business operator device 200, respectively, according to the embodiment, the CPU 1100 of the computer 1000 executes the programs loaded in the RAM 1200 and implements the functions of the control unit 14, the control unit 130, and the control unit 240, respectively. Herein, the CPU 1100 of the computer 1000 reads the programs from the recording medium 1800 and executes them. Alternatively, as another example, the programs can be obtained from some other device via a predetermined communication network.

[9. Miscellaneous]

Of the processes described in the embodiments, all or part of the processes explained as being performed automatically can be performed manually. Similarly, all or part of the processes explained as being performed manually can be performed automatically by a known method. The processing procedures, the control procedures, specific names, and information including a variety of data and parameters described in the embodiment or illustrated in the drawings can be changed as required unless otherwise specified. For example, a variety of information illustrated in the drawings is not limited to the information illustrated in the drawings.

The constituent elements of the device illustrated in the drawings are merely conceptual, and need not be physically configured as illustrated. The constituent elements, as a whole or in part, can be separated or integrated either functionally or physically based on various types of loads or use conditions.

The embodiments can be appropriately combined without causing any contradiction in the operation details.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Moreover, the terms "section", "module", and "unit" mentioned above can be read as "device" or "circuit". For example, a control unit can be read as a control device or a control circuit.

REFERENCE SIGNS LIST

1 information processing system
10 terminal device
11 communication unit
12 input unit
13 output unit
14 control unit
100 information processing device
110 communication unit
120 memory unit
121 user information storing unit
122 business operator information storing unit
130 control unit
131 receiving unit
132 calculating unit
133 sending unit
134 learning unit
141 receiving unit
142 specifying unit
143 sending unit
200 business operator device
210 communication unit
220 input unit
230 output unit
240 control unit
241 receiving unit

242 specifying unit
243 sending unit
N network

The invention claimed is:

1. An information processing device comprising:

a memory configured to store a three-dimensional model as a body model of a body of a user; and a processor configured to:

display, on a display screen, the three-dimensional model stored in the memory, and receive specification of a measurement position on the body;

calculate a body size corresponding to the specified measurement position based on the three-dimensional model when information corresponding to the specified measurement position is available;

calculate the body size based on information estimated from the three-dimensional model when information corresponding to the specified measurement position is not available; and send the calculated body size.

2. The information processing device according to claim 1, wherein the processor is further configured to learn about the measurement position based on the specification of the measurement position.

3. The information processing device according to claim 2, wherein the processor is further configured to:

correct the measurement position and calculate the body size; and learn about the corrected measurement position.

4. The information processing device according to claim 1, wherein the processor is further configured to send, as the body size, size information of only such measurement position which is allowed by the user.

5. The information processing device according to claim 1, wherein the processor is further configured to receive specification of the measurement position that is identified based on a reference position on outside of body as defined by the three-dimensional model.

6. The information processing device according to claim 1, wherein the processor is further configured to receive specification of the measurement position that is identified based on a reference position on inside of body as estimated based on the three-dimensional model.

7. The information processing device according to claim 1, wherein the processor is further configured to receive specification of the measurement position that is identified based on an operation performed with respect to a body size measurement costume used in creating the three-dimensional model.

8. The information processing device according to claim 1, wherein the processor is further configured to receive correction made by the user in specification of the measurement position.

9. An information processing method implemented in a computer, comprising:

storing a three-dimensional model as a body model of a body of a user;

displaying, on a display screen, the three-dimensional model, and receiving specification of a measurement position on the body;

calculating a body size corresponding to the specified measurement position based on the three-dimensional model when information corresponding to the specified measurement position is available;

calculating the body size based on information estimated from the three-dimensional model when information corresponding to the specified measurement position is not available; and sending the calculated body size.

10. A non-transitory computer-readable storage medium having stored therein a information processing program that causes a computer to execute a process comprising:

storing a three-dimensional model as a body model of a body of a user;

displaying, on a display screen, the three-dimensional model, and receiving specification of a measurement position on the body;

calculating a body size corresponding to the measurement position based on the three-dimensional model when information corresponding to the specified measurement position is available;

calculating the body size based on information estimated from the three-dimensional model when information corresponding to the specified measurement position is not available; and sending the calculated body size.

* * * * *